(12) United States Patent
Iwami

(10) Patent No.: US 6,593,443 B2
(45) Date of Patent: Jul. 15, 2003

(54) WOUND-CORE GOLF BALL

(75) Inventor: Satoshi Iwami, Kobe (JP)

(73) Assignee: Sumitomo Rubber Industries, Limited, Kobe (JP)

(*) Notice: Subject to any disclaimer, the term of this patent is extended or adjusted under 35 U.S.C. 154(b) by 0 days.

(21) Appl. No.: 09/945,733

(22) Filed: Sep. 5, 2001

(65) Prior Publication Data

US 2002/0052251 A1 May 2, 2002

(30) Foreign Application Priority Data

Sep. 5, 2000 (JP) .................................. 2000-269302

(51) Int. Cl.$^7$ .......................... A63B 37/12; A63B 37/06
(52) U.S. Cl. .......................... 528/63; 528/64; 528/67; 473/356; 473/357; 473/365
(58) Field of Search ............................. 473/356, 357, 473/365; 528/63, 64, 67

(56) References Cited

U.S. PATENT DOCUMENTS

| 3,989,568 | A | | 11/1976 | Isaac |
|---|---|---|---|---|
| 4,123,061 | A | | 10/1978 | Dusbiber |
| 4,884,814 | A | | 12/1989 | Sullivan |
| 5,334,673 | A | | 8/1994 | Wu |
| 5,947,843 | A | * | 9/1999 | Calabria |
| 6,309,313 | B1 | * | 10/2001 | Peter |
| 6,379,266 | B1 | * | 4/2002 | Ogg |
| 6,392,002 | B1 | * | 5/2002 | Wu |
| 6,435,986 | B1 | * | 8/2002 | Wu |

FOREIGN PATENT DOCUMENTS

JP 2000-157648 * 6/2000

* cited by examiner

*Primary Examiner*—David J. Buttner
(74) *Attorney, Agent, or Firm*—Birch, Stewart, Kolasch & Birch, LLP

(57) ABSTRACT

A wound-core golf ball having a polyurethane cover is disclosed. The polyurethane cover is formed by curing a composition including an isocyanate group terminated polyurethane prepolymer containing a residual polyisocyanate monomer in an amount of not more than 0.1 mass %; and an aromatic polyamine compound. Use of this isocyanate group terminated polyurethane prepolymer enables the homogeneous curing reaction even at the low temperature, thus the golf ball which has the polyurethane cover exhibiting excellent performance is obtained.

12 Claims, 1 Drawing Sheet

WOUND-CORE GOLF BALL

BACKGROUND OF THE INVENTION

1. Field of the Invention

The present invention relates to a wound-core golf ball with a polyurethane cover, which exhibits a long flight distance, stops easily due to a higher spin rate even if it is shot in the rough or in the rain, and imparts a good shot feeling like a Balata-covered golf ball to the golfer.

2. Description of the Related Art

A wound-core golf ball having a "Balata" cover is widely used by high-level golfers and professional golfers, because Balata cover is superior in feel and control. Herein, "feel" is the overall sensation to the golfer when the golf ball is hit, and "control" is to impart the motion such as back spin to the golf ball. However, the golf ball having a Balata cover is expensive due to a complicated manufacturing process and is inferior in durability and cut resistance.

For this reason, various cover stocks have recently been proposed in an attempt to replace the Balata cover.

For instance, a golf ball having an ionomer resin is disclosed in Japanese Unexamined Patent Publication No. H01-308577. The ionomer resin cover is less expensive and has a superior durability than the Balata cover. However, it is pointed out that the ionomer resin cover is poor in feel.

U.S. Pat. No. 4,123,061 discloses a golf ball made from a polyurethane prepolymer including toluene diisocyanate compound and 3,3'-dicholoro-4,4'-diaminodiphenylmethane as a curing agent. Golf balls with the polyurethane cover are known to have high impact resilience and to impart a good shot feeling as do Balat-covered golf balls.

As a curing agent for polyurethane prepolymer, aromatic polyamine compound is preferably used, because the heat resistance and mechanical properties of the resultant product are good. Especially, 3,3'-dichloro-4,4'-diaminodiphenylmethane and its derivatives are preferably used as a curing agent by the skilled artisan.

The wound-core golf ball with a polyurethane cover is formed by coating a composition including isocyanate group terminated polyurethane prepolymer and aromatic polyamine compound around the wound-core and then curing the composition. However, the following problems are pointed out in a process for mixing and curing the composition.

In the case that the aromatic polyamine compound has low reactivity to isocyanate group, it is inevitable that the curing time becomes longer, which results in lowering the productivity. When the curing reaction is not enough, the properties of the resultant polyurethane cover is also lowered. On the other hand, in the case that the reactivity to isocyanate group is too high, the polyurethane prepolymer increase in viscosity or become gelatinized during mixing.

Most of aromatic amine compounds have so high cohesion strength that they are crystalline at a room temperature. Thus, these aromatic amine compounds must be melted by heating them at least their melting point prior to use. Especially, 3,3'-dichloro-4,4'-diaminodiphenylmethane and its derivatives, which are preferably used as a curing agent for producing polyurethane, have the melting point of about 100° C., thus these curing agents usually need to be melted by heating about 120° C. for mixing and curing. For this reason, the curing reaction is promoted by the heat of these curing agents, resulting in increase in the viscosity or gelation of the polyurethane prepolymer. Further, the rubber thread layer is deteriorated by the heat when the curing reaction is conducted at 120° C. If the curing temperature and mixing temperature is lowered to avoid the heat deterioration of the rubber thread layer, deposit generates in the mixture of the polyurethane prepolymer and the curing agent. When the deposit generates, it is impossible to make the polyurethane cover due to the heterogeneous curing reaction.

SUMMARY OF THE INVENTION

According to the present invention, the wound-core golf ball with the polyurethane cover which is formed by curing a composition including isocyanate group terminated polyurethane prepolymer and aromatic amine compound homogeneously is obtained. An object of the present invention is to provide a wound-core golf ball with the polyurethane cover, which does not only overcome the above problems such as increase in the viscosity and gelation of the polyurethane prepolymer or generation of the deposit but also is excellent in terms of shot feeling, controllability and flight distance.

The inventor of the present invention has found that the deposit does not generate in the mixture of the isocyanate group terminated polyurethane prepolymer and aromatic amine compound even at low temperature if the isocyanate group terminated polyurethane prepolymer contains residual polyisocyanate monomer in an amount of not more than 0.1 weight % and has achieved the present invention.

Namely, the present invention provides a wound-core golf ball comprising a center;

a rubber thread layer covering the center; and a polyurethane cover covering the rubber thread layer, wherein the polyurethane cover is formed by curing a composition including an isocyanate group terminated polyurethane prepolymer containing a residual polyisocyanate monomer in an amount of not more than 0.1 mass %; and an aromatic polyamine compound.

DETAILED DESCRIPTION OF THE PREFERRED EMBODIMENTS

Figure 1:
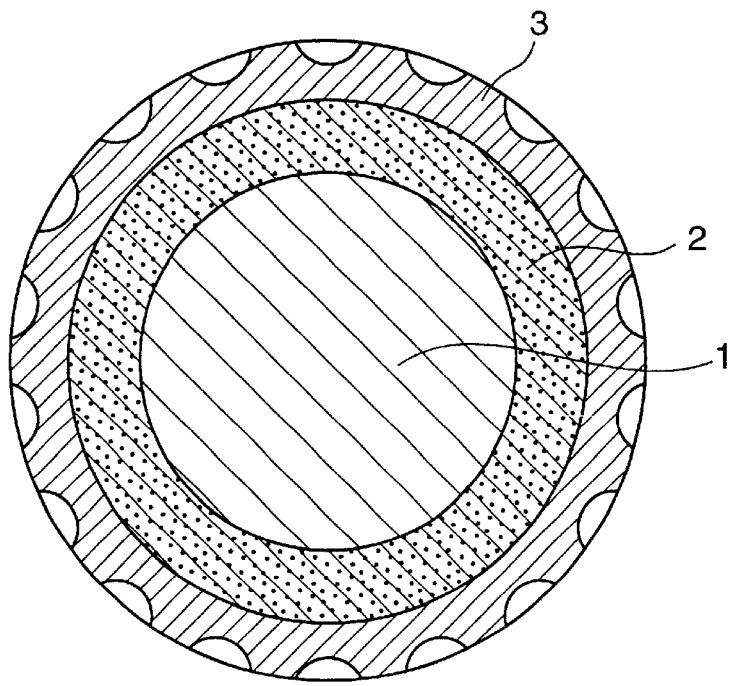
FIG. 1 is a schematic sectional view showing an example of the wound-core golf ball of the present invention.

The present invention will be explained in detail by way of an example with reference to FIG. 1. The wound-core golf ball of the invention comprises a center 1, a rubber thread layer 2 covering the center 1 and a polyurethane cover 3 covering the rubber thread layer 2. The polyurethane cover 3 is formed by curing a composition including isocyanate group terminated polyurethane prepolymer which contains residual polyisocyanate monomer in an amount of not more than 0.1 mass % and aromatic polyamine compound. The composition including isocyanate group terminated polyurethane prepolymer which contains residual polyisocyanate monomer in an amount of not more than 0.1 mass % and aromatic polyamine compound is hereinafter referred as to "polyurethane cover composition". First of all, the polyurethane cover 3 will be explained.

I. Polyurethane Cover Composition

The isocyanate group terminated polyurethane prepolymer (hereinafter referred as "isocyanate prepolymer") used for the polyurethane cover composition is not limited, as long as it has at least two isocyanate groups in a polyurethane prepolymer molecular chain and contains the residual polyisocyanate monomer in an amount of not more than 0.1 mass %. The location of each isocyanate group in a polyurethane prepolymer molecular chain is not particularly limited. The isocyanate group may be located at the terminal of the backbone chain or side chain of a polyurethane prepolymer molecular chain.

The isocyanate prepolymer can be obtained by reacting polyisocyanate compound with polyol so that isocyanate group of polyisocyanate compound is at least stoichiometric quantity of the hydroxyl group of polyol in molar ratio.

In the present invention, the residual polyisocyanate monomer means the polyisocyanate compound which remains unreacted in the isocyanate prepolymer after reacting the polyisocyanate compound and polyol to obtain the isocyanate prepolymer. An amount of the residual polyisocyanate monomer is defined as 100×(mass of the residual polyisocyanate monomer remaining in the isocyanate prepolymer/total mass of the isocyanate prepolymer) and determined by using a gas chromatography. If the residual polyisocyanate monomer is present in an amount of more than 0.1 mass % in the isocyanate prepolymer, the deposit will generate in the polyurethane cover composition at low temperature. The mechanism of the generation of the deposit is not apparent but it is assumed that the deposit generates by the reaction of residual polyisocyanate monomer and a curing agent. Since the generation of the deposit makes the curing reaction heterogeneously, it is impossible to produce the polyurethane cover.

Polyisocyanate compound for use in the isocyanate prepolymer includes, without limitation, for example, tolylene diisocyanate such as 2,4-toluene diisocyanate, 2,6-toluene diisocyanate and other isomers of toluene diisocyanate, a mixture of 2,4-toluene diisocyanate and 2,6-toluene diisocyanate (TDI); 4,4'-diphenylmethane dilsocyanate (MDI); 4,4'-dicyclohexylmethane dilsocyanate (hydrogenated MDI); hexamethylene diisocyanate (HDI); 1,5-naphthylene diisocyanate (NDI); 3,3'-bitoluene-4,4'-diisocyanate (TODI); isophorone diisocyanate (IPDI); paraphenylene diisocyanate (PPDI); and xylene diisocyanate (XDI). The polyisocyanate compound can be used individually or as the mixture of at least two of them. TDI or hydrogenated MDI, or a polyisocyanate compound including TDI or hydrogenated MDI as a major component are preferred in view of the durability, water resistance, impact resilience of an intended golf ball and the mechanical properties of the polyurethane cover. In the present invention, tolylene diisocyanate polyurethane prepolymer or the mixture of tolylene diisocyanate polyurethane prepolymer and hydrogenated MDI polyurethane prepolymer can be preferably used as the isocyanate prepolymer. Herein, tolylene diisocyanate polyurethane prepolymer means the isocyanate group terminated polyurethane prepolymer made from tolylene diisocyanate or polyisocyanate compound containing tolylene diisocyanate as a major component and polyol. Hydrogenated MDI polyurethane prepolymer means the isocyanate group terminated polyurethane prepolymer made from hydrogenated MDI or polyisocyanate compound containing hydrogenated MDI as a major component and polyol. Examples of the isocyanate prepolymer for use in the invention are Adiprene LF900A or LF950A and the like available from Uniroyal.

The polyol for use in the polyurethane cover composition may be any polyol, as long as the polyol has a plurality of hydroxyl groups. The polyol has no limitation on its molecular weight, and may include a low-molecular-weight polyol or a high-molecular-weight polyol.

Low molecular weight polyol includes, for example, diols such as ethylene glycol, diethylene glycol, triethylene glycol, 1,3-butanediol, 1,4-butanediol, neopentyl glycol, and 1,6-hexanediol; and triols such as glycerin, trimethylolpropane, and hexanetriol. High molecular weight polyol includes, for example, polyether polyol obtained by the reaction between an initiator having active hydrogen and alkylene oxide; polyester polyol obtained by the condensation between a dibasic acid such as adipic acid and a glycol or a triol; lactone polyester polyol obtained by the ring-opening polymerization of a lactone such as ε-caprolactone; polycarbonate diol generally synthesized using a cyclic diol; and polymer polyol such as an acrylic polyol prepared by introducing a hydroxyl group into an acrylic copolymer. Examples of polyether polyol are, without limitation, polyoxyethylene glycol, polyoxypropylene glycol (PPG), and polyoxytetramethylene glycol (PTMG). Examples of polyester polyol are, without limitation, polyethylene adipate (PEA), polybutylene adipate (PBA), and polyhexamethylene adipate (PHMA). An Example of such lactone polyester polyols is poly-ε-caprolactone (PCL). In view of their superior impact resilience and water resistance, polyether polyol is preferable. Especially, polyoxytetramethylene glycol is more preferable.

The preferable combination of the polyisocyanate compound and the polyol for the isocyanate prepolymer is the combination of TDI or hydrogenated MDI, or a polyisocyanate compound including TDI or hydrogenated MDI as a major component and polyoxytetramethylene glycol.

The aromatic polyamine compound used in the present invention is not limited, as long as it has at least two amino groups which are directly or indirectly attached to the aromatic ring. Examples of aromatic polyamine compounds are phenylene diamine, toluene diamine, 4,4'-diaminodiphenylmethane or xylene diamine and derivatives thereof. Among them, 4,4'-diaminodiphenylmethane and its derivatives represented by the following general formula (1) are preferable because the mechanical properties and heat resistance are good.

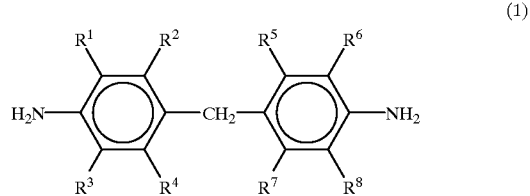

(1)

(In the formula, $R^1$ to $R^8$ represent any one of alkyl group which has 1 to 9 carbons, halogen atom or hydrogen atom, respectively.)

Examples of the alkyl groups are, without limitation, normal alkyl group including methyl, ethyl, propyl, butyl, pentyl, hexyl, heptyl, octyl and nonyl; branched alkyl group including i-propyl, i-butyl, sec-butyl, t-butyl and neopentyl and the like; cycloalkyl group including cyclopropyl, cyclobutyl, cyclopentyl and cyclohexyl. Examples of halogen atom are fluorine, chlorine, bromine and iodine. It is preferable to use chlorine and bromine. $R^1$ to $R^8$ may be different or same each other. Examples of the derivatives of 4,4'-diaminodiphenylmethane are 3,3'-dichloro-4,4'-diaminodiphenylmethane, 3,3'-dimethyl-5,5'-diethyl-4,4'-diaminodiphenylmethane, 3,3',5,5'-tetramethyl-4,4'-diaminodiphenylmethane, 3,3',5,5'-tetraethyl-4,4'-diaminodiphenylmethane, 3,3',5,5'-tetraisopropyl-4,4'-diaminodiphenylmethane, 3,3'-dimethyl-5,5'-diisopropyl-4, 4'-diaminodiphenylmethane, 3,3'-diethyl-5,5'-diisopropyl-4,4'-diaminodiphenylmethane, 3,3'-dimethyl-5,5'-di-t-butyl-4,4'-diaminodiphenylmethane, 3,3'-dichloro-5,5'-diethyl-4,4'-diaminodiphenylmethane, 2,2'-dichloro-3,3',5,5'-tetraethyl-4,4'-diaminodiphenylmethane, 2,2',3,3'-tetrachloro-4,4'-diaminediphenylmethane. It is preferred to use 2,2'-dichloro-3,3',5,5'-tetraethyl-4,4'-diaminodiphenylmethane because of low toxicity. The aromatic polyamine compound has no limitation on its amount for mixing in the isocyanate prepolymer, and is preferably mixed in a molar ratio of $NH_2/NCO=0.85$ to 1.15 with respect to the isocyanate prepolymer.

The polyurethane cover composition for use in the present invention may include the conventional catalyst which is used for the reaction of the polyurethane. Examples of such catalysts are monoamines such as triethylamine and N,N-dimethylcyclohexyl amine; polyamines such as N,N,N',N'-tetramethylethylene diamine and N,N,N',N'',N''-pentamethyldiethylene triamine; cyclic diamines such as 1,8-diazabicyclo[5,4,0]-7-undecene (DBU) and triethylene diamine; and tin catalysts such as dibutyltin dilaurylate and dibutyltin diacetate. Among these catalysts, it is preferable to use 1,8-diazabicyclo[5,4,0]-7-undecene (DBU) and triethylene diamine.

As required, the polyurethane cover composition may further contain a filler such as barium sulfate, a pigment such as titanium dioxide, and other additives such as dispersant, antioxidant, ultraviolet absorber, light stabilizer, and fluorescent material or fluorescent brightener unless they impair any undesirable property to the intended golf ball.

II. Structure of the Golf Ball

Figure 2:
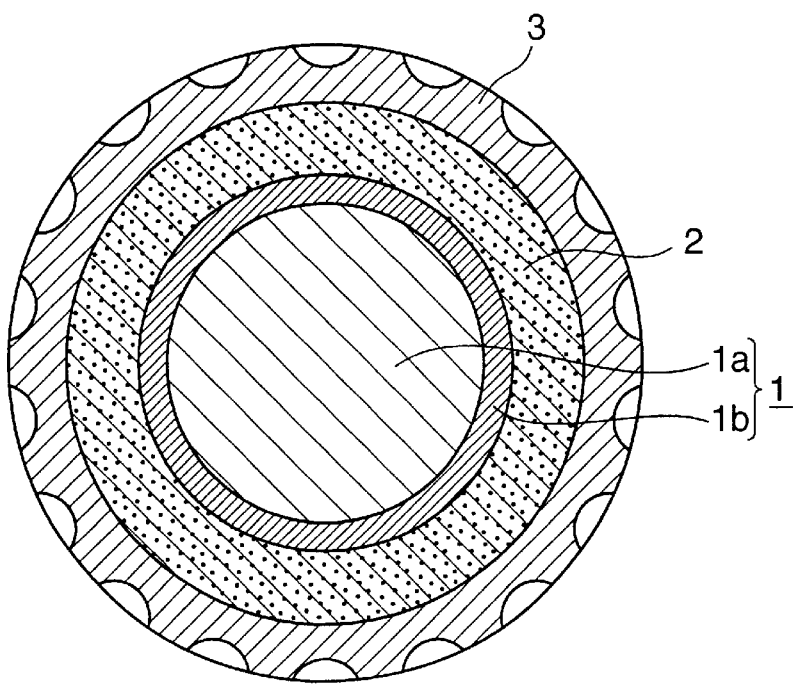
FIG. 2 is a schematic sectional view showing another example of the wound-core golf ball of the present invention.

The structure of the wound-core golf ball of the present invention is described in detail with reference to the accompanying drawings. FIG. 1 is a schematic sectional view showing an example of the wound-core golf ball of the present invention. As shown in FIG. 1, the wound-core golf ball of the present invention comprises a center 1 and a rubber thread layer 2 covering the center 1, and a polyurethane cover 3 covering the rubber thread layer 2. The center 1 may be formed with single layer or multiple layers. FIG. 2 is also a schematic sectional view showing another example of the wound-core golf ball of the present invention. In FIG. 2, the center 1 further consists of an inner core layer 1a and an outer core layer 1b covering the inner core layer 1a. In view of enhancing the controllability of the golf ball, the center 1 preferably consists of the inner core layer 1a and the outer core layer 1b.

The inner core layer 1a preferably has a diameter of at least 24 mm, more preferably at least 25 mm, and preferably has a diameter of not more than 33 mm, more preferably not more than 32 mm, most preferably not more than 31 mm. If the inner core layer 1a has the diameter less than 24 mm, the flexible features of the center are deteriorated, thus the golf ball exhibits the decreased flight distance as well as imparts a bad shot feeling to the, golfer. If the inner core layer 1a has the diameter of more than 33 mm, the outer core layer 1b is getting thin, thus the resultant golf ball does not have appropriate hardness.

The inner core layer 1a preferably has a JIS-A hardness of not more than 50, more preferably not more than 45. If the inner core layer 1a has the JIS-A hardness of more than 50, the center 1 becomes too hard, and hence the resulting golf ball tends to spin in a higher rate, resulting in a decreased flight distance. In addition, the shot feeling becomes bad. If the inner core layer 1a is too soft, it becomes difficult to mold the outer core layer 1b and to wind the rubber thread around the center, because the center tends to be transformed easily. For this reason, it is desirable that the inner core layer 1a has the JIS-A hardness of not less than 5, preferably not less than 10, more preferably not less than 15, most preferably not less than 20.

The inner core layer 1a does not have any limitation on its composition, as long as the inner core layer has the JIS-A hardness of from 5 to 50. The inner core layer 1a is preferably obtained by vulcanizing and molding a rubber composition containing an oily substance. Examples of rubber compositions for use in the inner core 1a are a butadiene rubber (BR), natural rubber (NR), ethylene-propylene-diene terpolymer (EPDM), polynorbornene or the like. It is desirable that the base rubber of the rubber composition is so highly compatible with the oily substance and allows the oily substance to be filled therein in a so high proportion as to exhibit adequate impact resilience when the rubber composition forms a cross-linking structure with the oily substance homogeneously dispersed in the rubber.

Examples of oily substances are a petroleum compounding oil, a plasticizer, a rubber substitute (factice), alkylbenzene, and a liquid rubber. The petroleum compounding oil is used as a rubber extender oil. Examples of petroleum compounding oils are paraffin oils (containing 50% or more paraffinic chains), naphthenic oils (containing 30% to 45% naphthenic ring-forming carbons), and aromatic oils (containing 30% or more aromatic carbons). Examples of specific plasticizers are phthalate-type plasticizers such as dibutyl phthalate (DBP) and dioctyl phthalate (DOP); adipate-type plasticizers such as dioctyl adipate (DOA); sebacate-type plasticizers such as dioctyl sebacate (DOS); phosphate-type plasticizers such as tricresyl phosphate (TCP); and adipic acid-type polyesters. The rubber substitute is prepared by vulcanizing a vegetable oil or the like with sulfur or sulfur chloride. Examples of the rubber substitutes are a semi-translucent factice, a black factice, and a brown factice. Examples of alkylbenzene are 1-dodecyl-4-hexylbenzene, 1-dodecyl-3-hexylbenzene, and 1,2,3-hemimellitene. Examples of the liquid rubbers are liquid polybutadiene and liquid polyisoprene. These oily substances may be used individually or as a mixture of at least two of them.

Taking the compatibility of the oily substance to the rubber into consideration, the combination of the oily substance and the base rubber can be determined.

Examples of suitable combinations are a combination of polybutadiene rubber or natural rubber and a naphthenic oil or an aromatic oil, a combination of EPDM and a paraffinic oil, a combination of polynorbornene and a naphthenic oil, an aromatic oil, a plasticizer, alkylbenzene or a paraffinic oil, and a combination of a polyurethane rubber and a plasticizer or a rubber substitute. The oily substance is preferably contained in the base rubber in an amount of about 30 to 500 parts, more preferably 50 to 400 parts based on 100 parts of the base rubber. If the oily substance is contained in an amount of less than 30 parts, any improvement cannot be expected. If the oily substance is contained in an amount of more than 500 parts, some combinations do not allow the oily substance to be mixed into the rubber.

The rubber composition for use in the inner core layer 1a may further contain a filler such as barium sulfate serving as a specific gravity adjuster, a reinforcing agent such as hydrous silicic acid or carbon black, a processing aid serving as a tackifier, an antioxidant, and the like in addition to the base rubber and the oily substance. Further, the rubber composition may include, to be described later, a polystyrene elastomer, a polyethylene elastomer, a polyurethane elastomer or the like. The inner core layer 1a, for example, can be obtained by kneading the rubber composition and vulcanizing and molding it in a mold at 150° C. to 170° C. for 10 to 20 minutes.

The outer core layer 1b of the present invention preferably has a Shore D hardness of not more than 60, more preferably not more than 55 in a state of covering the inner core layer 1a. If the outer core layer 1b has the Shore D hardness of more than 60, the center 1 becomes too hard. The excessively hard center tends to spin the resultant golf ball in a higher rate, resulting in a decreased flight distance. In addition, the shot feeling becomes bad. If the outer core layer 1b is too soft, the resultant golf ball is likely to exhibit a lowered repulsive property. For this reason, the outer core layer 1b preferably has the JIS-A hardness of at least 55 or a Shore D hardness of at least 10, more preferably a Shore D hardness of at least 15. With respect to the relation between the inner core layer 1a and the outer core layer 1b in terms of hardness, the outer core layer 1b may become softer than the inner core layer 1a as long as their respective hardness values are within the aforementioned respective hardness ranges. However, the respective hardness values of the inner core layer 1a and the outer core layer 1b in JIS-A hardness preferably satisfy the following relationship to achieve both of a high repulsive property and a good shot feeling.

(Outer core layer hardness−Inner core layer hardness)≧10(in JIS-A hardness)

The outer core layer 1b has no limitation on its raw material so long as the hardness of the outer core layer 1b is within the foregoing range. Examples of the raw material for use in the outer core layer 1b are thermoplastic resins such as polyurethane resin, ionomer resin, nylon, and polyethylene; and thermoplastic elastomers containing a soft segment portion and a hard segment portion in a molecule thereof, thereby developing rubber elasticity. The thermoplastic elastomers are preferably used in the present invention. The thermoplastic elastomer, for example, without limitation, includes at least one elastomer selected from the group consisting of a polystyrene elastomer, a polyolefin elastomer, a polyurethane elastomer, and a polyester elastomer. Use of a polyester elastomer is more preferable in order to prevent the oily substance from bleeding out of the inner core layer 1a.

Examples of commercial products of the polystyrene elastomers are "ESBS A1010" produced by DAISERU KAGAKUKOGYOU KABUSHIKI KAISHA, and "SEPTON HG-252" produced by KABUSHIKI KAISHA KURARE. Examples of commercial products of the polyolefin elastomers are "MILASTOMER M4800NW" produced by MITSUI KAGAKUKOGYO KABUSHIKI KAISHA, and "SUMITOMO TPE3682" and "SUMITOMO TPE9455" produced by SUMITOMO KAGAKUKOGYO KABUSHIKI KAISHA. Examples of commercial products of the polyurethane elastomers are "KURAMIRON 9195" and "KURAMIRON 9180" produced by KABUSIKI KAISHA KURARE, and "ELASTOLLAN ET680" produced by BASF POLYURETHANE ELASTOMERS KABUSHIKI KAISHA. Examples of commercial products of the polyester elastomers are "HYTREL 3548", "HYTREL 4047", "HYTREL 4767" and "HYTREL 5557" produced by TORAY-DUPONT KABUSHIKI KAISHA.

The outer core layer 1b may contain a specific gravity adjuster such as barium sulfate or tungsten, in addition to the aforementioned thermoplastic resin or thermoplastic elastomer. The thermoplastic resin and/or thermoplastic elastomer are preferably contained in the outer core layer 1b in an amount of not less than 50 mass %, more preferably not less than 80 mass %, most preferably not less than 90 mass % with respect to the total mass of the outer core layer 1b.

The outer core layer 1b can be formed by a process typically employed to form a golf ball cover. For example, the composition of the outer core layer 1b is formed into the shape of a hemispherical half shell to obtain two half shells, and the inner core layer 1a is wrapped with the two half shell, followed by pressure molding to obtain the center 1.

Alternatively, it is possible to injection-mold the composition of the outer core layer 1b directly onto the inner core layer 1a to wrap the inner core layer therein. In this way, the outer core layer having a thickness of 0.5 to 9 mm is formed on the inner core layer to obtain the center 1. The center 1 preferably has a diameter of at least 25 mm, more preferably at least 26 mm, and preferably has a diameter of not more than 35 mm, more preferably not more than 32 mm. If the diameter of the center 1 is less than 25 mm, the resultant golf ball exhibits a decreased flight distance because of spinning in a higher rate. On the other hand, if the diameter is more than 35 mm, the rubber thread layer becomes thinner, and hence the resultant golf ball does not have appropriate hardness.

The thus obtained center 1 is wound with the rubber thread used for golf balls to form a wound core comprising the center 1 and the rubber thread layer 2. As the rubber thread, it is possible to use typical materials conventionally used as rubber threads for golf balls.

An example of such a material is a rubber thread obtained by vulcanizing a rubber composition which comprises natural rubber or a mixture of natural rubber and a synthetic isoprene, sulfur, a vulcanization assistant, a vulcanization accelerator, an antioxidant and the like. The rubber thread layer 2 can be formed by a conventional process employed to form a wound core. The thickness of the rubber thread layer 2 is preferably at least 1.5 mm, more preferably at least 2.0 mm, and preferably not more than 7.5 mm, more preferably not more than 7.0 mm. If the thickness of the layer 2 is less than 1.5 mm, the repulsive property of the rubber thread is not sufficiently utilized. If the thickness of the layer 2 is more than 7.5 mm, the resulting golf ball tends to spin in a higher rate and draw a blown-up trajectory, resulting in a decreased flight distance.

The wound-core golf ball is, for example, without limitation, manufactured by coating the wound core with the foregoing polyurethane cover composition and allowing the composition to cure. The polyurethane cover composition can be mixed by a typical mixer for use in the mixing of a polyurethane prepolymer, for example, a two-part resin mixing dispenser. The mixing is preferably conducted at the temperature of not higher than 100° C., more preferably not higher than 80° C. and not lower than 10° C., more preferably not lower than 20° C. In the case that mixing is conducted at the temperature of higher than 100° C., highly toxic vapor generates from the isocyanate group terminated polyurethane prepolymer and pollutes the working atmosphere. Further, the working operation at a lower temperature is preferred in view of safety, and an increase in viscosity or gelation is likely to occur due to the curing reaction proceeding during the mixing. In the case that mixing is conducted at the temperature of lower than 10° C., the viscosity of the isocyanate group terminated polyurethane prepolymer becomes too high, and hence it is difficult to disperse the aromatic polyamine compound therein homogeneously.

Subsequently, the polyurethane cover composition is injected into a hemispherical mold holding the wound core therein, and then the mold is inverted and mated with another hemispherical mold into which the polyurethane cover composition has been injected, followed by curing.

The curing reaction is preferably conducted at the temperature of 500° C. to 120° C., more preferably from 50° C. to 100° C. If the curing reaction is conducted at the temperature of higher than 120° C., the rubber thread layer is deteriorated by heat, resulting in the poor repulsive property. If the repulsive property of the rubber thread layer is lowered, the resultant golf ball exhibits the lower retention of spin, in spite of having a polyurethane cover. If the curing reaction is conducted at the temperature of lower than 50° C., the curing reaction needs a longer time or curing reaction becomes incompletely. In the case of incomplete curing reaction, the properties of the polyurethane cover is lowered.

According to the present invention, use of the polyurethane cover composition enables the curing reaction to be conducted homogeneously even at the low temperature as low as from 60° C. to 80° C. without generation of the deposit. Thus, the wound-core golf ball which exhibits a satisfactory repulsive property and a good shot feeling without deteriorating its rubber thread layer is obtained. The curing time is suitably adjusted in accordance with the curing temperature. When the curing temperature is within the range between 60° C. and 120° C., the curing can be conducted for not longer than 30 minutes, preferably not longer than 15 minutes.

The polyurethane cover 3, without limitation, preferably has a shore D hardness of at least 40, more preferably at least 43, most preferably at least 45, and preferably has a shore D hardness of not more than 65, more preferably not more than 63, most preferably not more than 60.

The surface of the polyurethane cover is formed with a multiplicity of dimples during the molding of the cover where necessary. Further, the golf ball of the present invention is usually provided with paint finish, a marking stamp and the like to enhance the appearance and commercial value thereof before it is put on the market.

It is noted that the cover of the golf ball of the present invention may comprise a single layer or plural layers.

EXAMPLE

Evaluation Method

1. Measurement of Hardness

The hardness of the inner core layer 1a was measured by bringing a spring type hardness tester A prescribed by JIS-K6301 into contact with the surface of the inner core 1a in a ball state.

The hardness of the outer core layer 1b and the cover 3 were measured by a spring type hardness tester D prescribed by ASTM-D2240 by bringing the hardness tester into contact with the outer core layer 1b in a state covering the inner core layer 1a or with the cover 3 in a state covering the wound core, respectively.

The slab hardness of the cover composition was determined according to ASTM-D2240. The cover composition was formed into a sheet having a thickness of about 2 mm with a hot mold press and then the sheet was stored at 23° C. for 2 weeks. The slab hardness of the sheet was measured by stacking three or more sheets one upon another.

PGA compression of the wound-core golf ball was measured by using a ATTI compression tester produced by ATTI Engineering Co.

2. Flying Performance of the Golf Ball

A golf ball was hit with a wood club #1 (W#1) and a sand wedge(SW) attached to a swing robot manufactured by TRUE TEMPER Co. at the head speed of 45 m/sec. and 20 m/sec., respectively. In the case of the wood club #1, the golf ball was hit in a dry condition. In the case of the sand wedge, the gold ball was hit in a wet condition by allowing the club surface to be wet, in addition to the dry condition.

2-1) Spin Rate(rpm)

The spin rate of a golf ball was determined by taking a serial photograph of the golf ball hit.

2-2) Retention of Spin Rate

The retention of the spin rate was defined as follows.

Retention of spin rate=100×(spin rate in wet condition/spin rate in dry conditions)

The larger value of the retention means to keep the higher spin rate even in the rain. Namely the larger value means the excellence in the controllability.

2-3) Flight Distance

A distance to the point at which the golf ball fell to the ground was measured.

2-4) Initial Golf Ball Speed

The initial speed of a golf ball hit was measured.

3. Shot Feeling

The shot feeling of a golf ball was evaluated by ten top-level professional golfers in an actual hitting test based on the following criteria. The largest number of the criteria level was determined as the result of the evaluation for a golf ball.

Criteria

"Good": A golf ball gives a small impact and imparts a sensation of sufficient repulsion.

"Fair": A golf ball gives a somewhat large impact or imparts a sensation of somewhat insufficient repulsion.

"Bad": A golf ball gives a large impact or imparts a sensation of unappreciable repulsion or of heaviness.

Manufacture of the Golf Ball

1. Manufacture of the Center 1

According to the formulation shown in Table 1, each rubber composition for the inner core layer 1a and the center 1 was kneaded and then pressed in a mold at 160° C. for 15 minutes in order to form the inner core layer 1a and the center 1.

When the center is formed with two layers, HYTREL4047(Polyester type of Thermoplastics elastomer produced by TORAY-Dupon) was used for the outer core layer 1b and injected directly onto the inner core layer 1a to obtain the center 1.

TABLE 1

| Formulation of the inner core 1a | | | |
|---|---|---|---|
| Raw materials | | Core A | Core B |
| Norsorex | *1) | 100 | — |
| Alkylbenzene oil | *2) | 200 | — |
| BR11 | *3) | — | 100 |
| Zinc oxide | | 5 | 5 |
| Stearic acid | | 1 | 2 |
| Barium sulfate | | 240 | 75 |
| Sulfur | | 2.5 | 10 |
| Noccelar ZTC | *4) | 3 | — |
| Noccelar DM | *5) | 2 | — |
| Noccelar CZ | *6) | — | 1.5 |
| Noccelar TT | *7) | — | 0.2 |
| JIS-A-hardness | | 30 | 75 |

Units: parts
Notes on table 1:
*1) Polynorbornene rubber produced by NIHON ZEON KABUSHIKI KAISHA;
*2) Alkylbenzene oil produced by NIHON ZEON KABUSHIKI KAISHA;
*3) High-cis-polybutadiene rubber produced by JSR KABUSHIKI KAISHA;
*4) Vulcanization accelerator (zinc dibenzyldithiocarbamate) produced by OOUCHI SHINKOKAGAKUKOGYO KABUSHIKI KAISHA;
*5) Vulcanization accelerator (dibenzothiazyl disulfide) produced by OOUCHI SHINKOKAGAKUKOGYO KABUSHIKI KAISHA;
*6) Vulcanization accelerator (N-cyclohexyl-2-benzothiazylsulfenamide) produced by OOUCHI SHINKOKAGAKUKOGYO KABUSHIKI KAISHA; and
*7) Vulcanization accelerator (tetramethylthiuram disulfide) produced by OOUCHI SHINKOKAGAKUKOGYO KABUSHIKI KAISHA.

2. Manufacture of Wound Core

Rubber thread made from a blended rubber comprising a base rubber of natural rubber/low-cis-isoprene rubber ("SHELL IR-309" produced by SHELL KAGAKU Co.) having a mass ratio of 50/50 was wound around the aforementioned center, to form a wound core having an outer diameter of about 39.6 mm.

3. Manufacture of Cover

According to the formulation shown in Table 2, the polyurethane cover composition was prepared. The polyurethane cover composition was injected into a hemispherical mold holding the wound core therein, and then this mold was inverted and mated with another hemispherical mold containing the polyurethane cover composition injected therein, followed by press molding and curing the polyurethane cover composition. The curing conditions were also shown in Table 2.

screw L/D=35, and the cover composition was heated to from 200° C. to 260° C. at the die position of the extruder. The cover composition thus prepared was molded into a hemispherical half shell, and the wound core was wrapped with the two half shells, followed by press compression molding at 150° C.

4. Manufacture of Ball

The ball thus molded was removed from the molds, deburred, and then coated with a white paint and a clear

TABLE 2

| Raw materials | I | II | III | IV | V | VI | VII | VIII | IX |
|---|---|---|---|---|---|---|---|---|---|
| PU prepolymer | | | | | | | | | |
| Adiprene LF900A *8) | 100 | — | 80 | — | — | — | — | — | — |
| Adiprene LF930A *9) | — | 100 | — | — | 100 | — | — | — | — |
| Adiprene LF950A *10) | — | — | 20 | — | — | — | — | — | — |
| Adiprene LF0330 *11) | — | — | — | 100 | — | — | — | — | — |
| Adiprene L200 *12) | — | — | — | — | — | 100 | 100 | 100 | — |
| Curing Agent | | | | | | | | | |
| Iharacuamine MT *13) | — | — | — | — | 15.3 | — | 22.7 | — | — |
| Ronzacure M-CDEA *14) | 15.8 | 21.4 | 17.8 | 27.7 | — | 32.0 | — | — | — |
| Elasmer 1000P *15) | — | — | — | — | — | — | — | 94.8 | — |
| Titanium dioxide | 2 | 2 | 2 | 2 | 2 | 2 | 2 | 2 | 2 |
| Ionomer cover composition | | | | | | | | | |
| Himilan 1855 | — | — | — | — | — | — | — | — | 50 |
| Himilan 1555 | — | — | — | — | — | — | — | — | 20 |
| Surlyn 6320 | — | — | — | — | — | — | — | — | 30 |
| Residual polyisocyanate monomer (wt %) | 0.1 | 0.1 | 0.1 | 0.1 | 0.1 | 2.5 | 2.5 | 2.5 | — |
| Curing conditions | | | | | | | | | |
| Temp. of Prepolymer (° C.) | 60 | 60 | 60 | 60 | 60 | 60 | 80 | 80 | — |
| Temp of Curing agent (° C.) | 120 | 120 | 120 | 120 | 120 | 120 | 120 | 80 | — |
| Curing temperature (° C.) | 70 | 70 | 70 | 70 | 70 | 120 | 120 | 100 | 150 |
| Curing time (mins.) | 10 | 10 | 10 | 10 | 10 | — | 10 | 30 | 5 |
| Slab hardness (Shore D) | 44 | 49 | 46 | 54 | 47 | — | 54 | 40 | 49 |

Unit: parts
Note on table 2
ADIPRENE LF900A: TDI/PTMG-type polyurethane prepolymer having an NCO content of 3.7% produced by UNIROYAL Co and the residual tolylene diisocyanate is in an amount of not more than 0.1 mass %.
ADIPRENE LF530A: TDI/PTMG-type polyurethane prepolymer having an NCO content of 5.0% produced by UNIROYAL Co and the residual tolylene diisocyanate is in an amount of not more than 0.1 mass %.
ADIPRENE LF-950A: TDI/PTMG-type polyurethane prepolymer having an NCO content of 6.04% produced by UNIROYAL Co and the residual tolylene diisocyanate is in an amount of not more than 0.1 mass %.
ADIPRENE LF0330: Mixture of TDI/PTMG-type polyurethane prepolymer and hydrogenated MDI/PTMG polyurethane prepolymer produced by UNIROYAL Co and the total residual diisocyanate monomer is in an amount of not more than 0.1 mass %.
ADIPRENE L-200: TDI/PTMG-type polyurethane prepolymer having an NCO content of 7.5% produced by UNIROYAL CO and the residual tolylene diisocyanate is in an amount of 2.5 mass %.
IHARACUAMIN NT: 3,3'-dichloro-4,4'-diaminodiphenylmethane produced by IHARA CHEMICAL KOGYO KABUSHIKI KAISHA
RONZACUREM-CDEA: 2,2'-dichloro-3,3',5,5'-tetraethyl-4,4'-diaminodiphenylmethane having an amine value of 297 mg KOH/g produced by UNIROYAL Co.
ELASMER1000P: Polyoxytetramethyleneoxidediaminobenzoate having an amine value of 100.5 mg KOH/g produced by Air products Co.
HIMILAN 1855: zinc ion-neutralized ethylene-methacrylic acid-butyl acrylate ionomer resin.
HIMILAN 1555: zinc ion-neutralized ethylene-methacrylic acid ionomer resin.
SURLYN 6320 magnesium ion-neutralized ethylene-methacrylic acid-butyl acrylate ionomer resin.

In the cover composition VI of Table 2, the polyurethane cover could not be formed because the deposit generated in the polyurethane cover composition.

The ionomer resin cover formed from cover composition IX was manufactured by the following process. HIMILAN 1855, HIMILAN 1555 and SURLYN 6320 are mixed using a twin-screw kneading extruder to obtain the cover composition in the form of pellet. The extrusion was conducted in the following conditions:

screw diameter=45 mm,
screw revolutions=200 rpm, paint, to obtain a wound-core golf ball having a diameter of 42.8 mm and a mass of 45.4 g.

Performances of the Golf Ball

According to the measurement and evaluation methods described above, the inner core layer 1a and the outer core layer 1b were measured in terms of their respective hardness and diameter, and the hardness of the cover was measured. The performance of the wound-core golf ball thus obtained were also determined. The results of the measurements were shown in Table 3.

TABLE 3

Structure and Properties of Golf ball

| Properties of golf ball | Examples | | | | | | Comparative Examples | | | |
|---|---|---|---|---|---|---|---|---|---|---|
| | 1 | 2 | 3 | 4 | 5 | 6 | 1 | 2 | 3 | 4 |
| Structure of center | double | double | double | single | double | double | single | single | single | single |
| Inner core | | | | | | | | | | |
| formulation | A | A | A | B | A | A | A | B | B | B |
| diameter (mm) | 29.5 | 27.5 | 27.5 | — | 27.5 | 27.5 | 27.5 | — | — | — |
| JIS-A-hardness | 30 | 30 | 30 | 75 | 30 | 30 | 30 | 75 | 75 | 75 |
| Outer core | | | | | | | | | | |
| formulation | Hytrel | Hytrel | Hytrel | — | Hytrel | Hytrel | Hytrel | — | — | — |
| Shore-D-hardness | 40 | 40 | 40 | — | 40 | 40 | 40 | — | — | — |
| Center diameter (mm) | 31.5 | 31.5 | 31.5 | 31.5 | 31.5 | 31.5 | 31.5 | 31.5 | 31.5 | 31.5 |
| Cover | | | | | | | | | | |
| formulation | I | II | III | III | IV | V | VII | VII | VIII | IX |
| Shore-D-hardness | 53 | 58 | 55 | 55 | 63 | 56 | 63 | 63 | 48 | 53 |
| PGA compression | 81 | 88 | 84 | 85 | 90 | 85 | 82 | 84 | 77 | 78 |
| Flying perfomance of golf ball | | | | | | | | | | |
| Wood #1 | | | | | | | | | | |
| Initial speed (m/s) | 64.6 | 65.1 | 64.9 | 64.7 | 65.4 | 65.0 | 63.7 | 63.5 | 62.9 | 63.1 |
| Spin rate (rpm) | 2850 | 2750 | 2800 | 2830 | 2690 | 2760 | 2700 | 2680 | 3100 | 3000 |
| Flight distance (yard) | 222.8 | 223.5 | 223.4 | 222.9 | 224.0 | 223.6 | 221.9 | 221.7 | 219.3 | 220.1 |
| Sand wedge | | | | | | | | | | |
| Dry Spin rate (rpm) | 6950 | 6880 | 6900 | 6920 | 6850 | 6890 | 6800 | 6900 | 7300 | 7200 |
| Wet Spin rate (rpm) | 3700 | 3550 | 3680 | 3610 | 3500 | 3560 | 3000 | 2900 | 3100 | 2700 |
| Retention of Spin rate (%) | 53.2 | 51.6 | 53.3 | 52.2 | 51.1 | 51.7 | 44.1 | 42.0 | 42.5 | 37.5 |
| Shot feeling | good | good | good | good | good | good | bad | bad | bad | bad |

As seen from Table 3, the wound-core golf ball of the present invention exhibited a good shot feeling and an increased flight distance. The retention of spins are more than 50% in terms of Examples 1 to 6, thus it has been apparent that the golf ball of the present invention exhibits the excellent controllability even in the rain.

In Comparative Examples 1 and 2, the curing reaction was conducted at 120° C. to prevent the deposit from generating in the polyurethane cover composition, thus the rubber thread layer 2 was deteriorated by heat. As a result, shot feeling became bad and the retention of spin rate was lowered, because the repulsive property of the golf ball was lowered.

Comparative Example 3 was an example using non-aromatic polyamine compound as a curing agent. The curing reaction was able to be conducted at 100° C. without the generation of the deposit. However, the curing reaction needed about 30 mins, thus the productivity was lowered. In Comparative Example 4, the shot feeling became bad because the ionomer resin cover was used. Further, since the ionomer resin cover was slippery, both the spin rate in the wet condition and the retention of spin rate were lowered.

According to the present invention, use of the isocyanate prepolymer containing the residual polyisocyanate monomer in an amount of not more than 0.1 mass % enables the curing reaction to be conducted homogeneously even at the low temperature without generation of the deposit during mixing and curing the polyurethane cover composition. As a result, the properties of the polyurethane cover was excellent. Since the curing reaction is able to be conducted at the temperature as low as from 50° C. to 100° C., it is possible to prevent the rubber thread layer 2 from being deteriorated by heat. Thus, the wound-core golf ball which exhibits a good shot feeling and good controllability and increased flight distance is obtained. Further, the polyurethane cover of the golf ball of the present invention is excellent in cut resistance and durability because of its cross-linking structure.

This application is based on Japanese Patent application No. 2000-269302 filed on Sep. 5, 2000, the contents of which are hereby incorporated by reference.

What is claimed is:

1. A wound-core golf ball comprising
    a center having a diameter of 25 to 35 mm, which consists of an inner core layer having a diameter of 24 to 33 mm and a JIS-A-hardness of 5 to 50, and an outer core layer covering the inner core layer and having a Shore D hardness of 10 to 60;
    a rubber thread layer covering the center; and
    a polyurethane cover covering the rubber thread layer, wherein the polyurethane cover has a Shore D hardness of 40 to 65 and is formed by curing a composition including an isocyanate group terminated polyurethane prepolymer containing a residual polyisocyanate monomer in an amount of not more than 0.1 mass %; and an aromatic polyamine compound.

2. The wound-core golf ball according to claim 1, wherein the aromatic polyamine compound is 4,4'-diaminodiphenylmethane or its derivatives represented by the following formula (1).

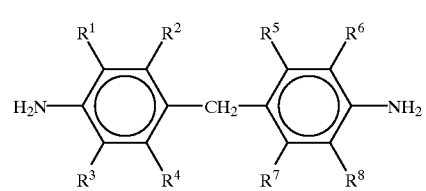

(1)

(In the formula (1), $R^1$ to $R^8$ represent any one of an alkyl group having 1 to 9 carbons, halogen atom or hydrogen atom).

3. The wound-core golf ball according to claim 1, wherein the aromatic polyamine compound is 2,2'-dichloro-3,3',5,5'-tetraethyl-4,4'-diaminodiphenylmethane.

4. The wound-core golf ball according to claim 1, wherein the isocyanate group terminated polyurethane prepolymer is the mixture of tolylene diisocyanate polyurethane prepolymer and 4,4'-dicyclohexylmethane diisocyanate polyurethane prepolymer.

5. The wound-core golf ball according to claim 3, wherein the isocyanate group terminated polyurethane prepolymer is the mixture of tolylene diisocyanate polyurethane prepolymer and 4,4'-dicyclohexylmethane diisocyanate polyurethane prepolymer.

6. The wound-core golf ball according to claim 5, wherein the outer core layer is made from a at least one thermoplastics elastomer selected from the group consisting of a polyurethane elastomer, a polyester elastomer, a polyolefin elastomer, and a polystyrene elastomer.

7. A wound-core golf ball comprising
a center having a diameter of 26 to 32 mm, which consists of an inner core layer having a diameter of 25 to 31 mm and a JIS-A-hardness of 20 to 45, and an outer core layer covering the inner core layer and having a Shore D hardness of 15 to 55;
a rubber thread layer covering the center; and
a polyurethane cover covering the rubber thread layer, wherein the polyurethane cover has a Shore D hardness of 45 to 60 and is formed by curing a composition including an isocyanate group terminated polyurethane prepolymer containing a residual polyisocyanate monomer in an amount of not more than 0.1 mass %; and an aromatic polyamine compound at the temperature of from 50 to 100° C.

8. The wound-core golf ball according to claim 7, wherein the outer core layer and the inner core layer satisfy the following equation in terms of JIS-A hardness:

(Outer core layer hardness−Inner core layer hardness)≧10.

9. The wound-core golf ball according to claim 8, wherein the aromatic polyamine compound is 4,4'-diaminodiphenylmethane or its derivatives represented by the following formula (1).

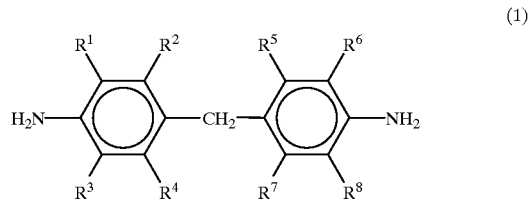

(In the formula (1), $R^1$ to $R^8$ represent any one of an alkyl group having 1 to 9 carbons, halogen atom or hydrogen atom).

10. The wound-core golf ball according to claim 8, wherein the aromatic polyamine compound is 2,2'-dichloro-3,3',5,5'-tetraethyl-4,4'-diaminodiphenylmethane.

11. The wound-core golf ball according to claim 10, wherein the isocyanate group terminated polyurethane prepolymer is the mixture of tolylene diisocyanate polyurethane prepolymer and 4,4,-dicyclohexylmethane diisocyanate polyurethane prepolymer.

12. The wound-core golf ball according to claim 11, wherein the outer core layer includes a polyester elastomer.

* * * * *